(12) United States Patent
Hong

(10) Patent No.: US 6,268,997 B1
(45) Date of Patent: Jul. 31, 2001

(54) FLAT-PANEL DISPLAY APPARATUS HAVING STAND UNIT WITH CABLE PASSING THROUGH HINGE SHAFT

(75) Inventor: Yu-Sik Hong, Kyungki-do (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 08/965,642

(22) Filed: Nov. 6, 1997

(30) Foreign Application Priority Data

Nov. 6, 1996 (KR) .................................................. 96-52394

(51) Int. Cl.⁷ .................................. G06F 1/16; H05K 5/02
(52) U.S. Cl. ............................ 361/681; 248/918; 248/398
(58) Field of Search ..................... 361/680–683, 361/686; 248/917–923, 398

(56) References Cited

U.S. PATENT DOCUMENTS

| | | |
|---|---|---|
| 3,936,026 | 2/1976 | Hampel et al. . |
| 4,310,136 | 1/1982 | Mooney . |
| 4,437,638 | 3/1984 | Scheibenpflug . |
| 4,447,031 | 5/1984 | Souder, Jr. . |
| 4,566,663 | 1/1986 | Barchus . |
| 4,624,434 | 11/1986 | Lake et al. . |
| 4,691,886 | 9/1987 | Wendling et al. . |
| 4,762,378 | 8/1988 | Kagami . |
| 4,781,422 | 11/1988 | Kimble . |
| 4,919,387 | 4/1990 | Sampson . |
| 4,944,481 | 7/1990 | Yurchenco . |
| 5,081,742 | 1/1992 | Kobayashi . |
| 5,088,680 | 2/1992 | Farmer . |
| 5,100,098 | 3/1992 | Hawkins . |
| 5,108,062 | 4/1992 | Detwiler . |
| 5,168,423 | 12/1992 | Ohgami et al. . |
| 5,247,285 | 9/1993 | Yokota et al. . |
| 5,271,594 | 12/1993 | Djelouah . |
| 5,335,142 | 8/1994 | Anderson . |
| 5,569,895 | 10/1996 | Lynch et al. . |
| 5,588,625 | 12/1996 | Beak . |
| 5,590,021 | 12/1996 | Register . |
| 5,632,463 | 5/1997 | Sung et al. . |
| 5,646,818 | 7/1997 | Hahn . |
| 5,666,694 | 9/1997 | Slow et al. . |
| 5,715,137 | 2/1998 | Choi . |
| 5,732,922 | 3/1998 | Jeon . |
| 5,751,548 | 5/1998 | Hall et al. . |
| 5,786,983 | 7/1998 | Brenner et al. . |
| 5,788,851 | * 8/1998 | Kenley et al. ........................ 361/681 |
| 5,850,997 | * 12/1998 | Rosen .................................. 248/917 |
| 5,854,735 | 12/1998 | Cheng . |
| 5,859,762 | * 1/1999 | Clark et al. .......................... 361/686 |
| 6,024,335 | 2/2000 | Min . |

\* cited by examiner

*Primary Examiner*—Lynn D. Feild
(74) *Attorney, Agent, or Firm*—Robert E. Bushnell, Esq.

(57) ABSTRACT

A flat-panel display apparatus has a display unit with dual-axis adjustment capability. A cable supplying display signals and electrical power to the display unit passes through a vertically-oriented hinge shaft rotatably connecting the display unit to a stand unit, thus preventing an undesired twisting of the cable.

12 Claims, 4 Drawing Sheets

FLAT-PANEL DISPLAY APPARATUS HAVING STAND UNIT WITH CABLE PASSING THROUGH HINGE SHAFT

CLAIM OF PRIORITY

This application makes reference to, incorporates the same herein, and claims all benefits accruing under 35 U.S.C. §119 from an application entitled FLAT-PANEL DISPLAY APPARATUS earlier filed in the Korean Industrial Property Office on Nov. 6, 1996, and there duly assigned Serial No. 96-52394 by that Office.

BACKGROUND OF THE INVENTION

1. Field of the Invention

The present invention relates to a flat-panel display apparatus and, more specifically, to a flat-panel display apparatus having a cable running from a stand unit to a display unit, wherein the space occupied by the cable is minimized and wherein cable twisting and interference with other components is prevented.

2. Discussion of Related Art

The basic structure of a general flat-panel display apparatus consists of a display unit, which is flat and thin, and a stand unit for supporting the display unit. In such a display, typically, a flat flexible cable (ribbon), supplying a display signal and electrical power, courses through the hinge located between the display unit and stand. Such a configuration assumes that the angle of the display screen is adjustable forward and backward only, that is, along a horizontal axis, and does not accommodate rotation (swivel) along a vertical axis.

Exemplars of the contemporary practice in the art include U.S. Pat. No. 4,310,136, issued to Mooney for a Backlash-free Swivel and Tilt Mounting, which describes an oversized support shaft journaled in dual ball bearings housed in a base. The base includes a plate with an aperture receiving a cylindrical section of a support shaft, rotatably secured therein with a set of bearings. The device does not include a central inner passage for a cable. U.S. Pat. No. 4,437,638, issued to Scheibenpflug for an Arrangement for Fastening a Monitor to a Text Station, describes a monitor mounted on a support column with a bracket having holes registered with holes in the support column, a shaft being received therethrough. The support column defines an inner race slidingly received in an outer race of extension arm, providing rotational freedom therebetween. The device does not include a central inner passage for a cable. U.S. Pat. No. 4,447,031, issued to Sounder, Jr. et al for a Spring Counterbalanced Support Arm System, describes a nose bracket mounted on a television set. The nose bracket includes flanges with registered holes. Screws received in the holes engage an anchor tube receiving a tension pin engaged with a swivel arm. The tension pin provides for relative rotation between the swivel arm and nose bracket. The device does not include a central inner passage for a cable. U.S. Pat. No. 5,335,142, issued to Anderson for a Portable Computer Display Tilt/swivel mechanism, describes a yoke 42 with flanges having registered holes. A tilt base has complementary flanges with registered holes. The yoke and base holes receive a hollow tilt tube. The base mounts on a swivel disk received within a groove defined by a split mounting ring. The device does not include a hinge member having a central aperture configured to receive a vertical hinge shaft, fixed relative to a stand, providing a central inner passage for a cable. U.S. Pat. No. 4,762,378, issued to Kagami for a Display Apparatus, describes a base with oblique or offset upstanding flanges with registered holes. The chassis and neck frame of a monitor pivot relative to the base about a connecting bolt received in the holes. The device does not include a hinge member having a central aperture configured to receive a vertical hinge shaft, fixed relative to a stand, providing a central inner passage for a cable. U.S. Pat. No. 4,944,481, issued to Yurchenco et aL for a Balanced Monitor Stand, describes a base with an oblique tab having a first horizontal throughbore. A platform mounted on a monitor has a second throughbore in registry with the first throughbore. The tab and platform rotate in a vertical plane about a pin received in the throughbores. The device does not provide for rotation of the monitor. U.S. Pat. No. 5,108,062, issued to Detwiler for a Pivot Apparatus, describes a clam shell socket member rotatably secured to a housing member. A leg portion extends from one of the clam shell socket members to a base portion mounted in a base member. The device does not provide for rotation of the monitor. U.S. Pat. No. 5,588,625, issued to Beak for a Monitor Stand Assembly, describes an upper stand portion having a slot. A stand base portion has a coupler bar received in the slot. When the upper stand portion is rotated relative to the stand base portion, projections of the coupler bar prevent disassembly thereof. The device does not include a hinge member having a central aperture configured to receive a vertical hinge shaft, fixed relative to a stand, providing a central inner passage for a cable.

After careful study of the exemplars of contemporary practice in the art, I have found a need exists for a flat-panel display apparatus in which the cable carrying display signals and electrical power occupies minimal space and is not subject to twisting or interference with other components.

SUMMARY OF THE INVENTION

Accordingly, the present invention is directed to a flat-panel display apparatus that substantially obviates one or more of the limitations and disadvantages of the related art.

An objective of the present invention is to provide an improved flat-panel display apparatus having a display unit that may be rotated forward and backward and from side to side to optimize its viewing angle, and in which an undesired twisting of a cable for supplying display signals and electrical power to the display unit is prevented.

Another objective of the present invention is to provide a flat-panel display apparatus in which the cable is not exposed, enabling a product design improvement.

Additional features and advantages of the invention will be set forth in the description which follows, and in part will be apparent from the description, or may be learned by practice of the invention. The objectives and other advantages of the invention will be realized and attained by the structure as illustrated in the written description and claims hereof, as well as the appended drawings.

To achieve these and other advantages, and in accordance with the purpose of the present invention as embodied and broadly described, a flat-panel display apparatus is provided with a cable, supplying display signals and electrical power to a display unit, which passes through a hinge shaft in a hinge unit, which supports the display unit and rotatably connects the display unit to a stand unit. The hinge shaft is oriented vertically. The cable connects an interface circuit board to a main circuit board through an enclosed space formed in a lower part of the display unit.

It is to be understood that both the foregoing general description and the following detailed description are merely exemplary and are intended to provide further explanation of the invention as claimed.

BRIEF DESCRIPTION OF THE ATTACHED DRAWINGS

A more complete appreciation of the invention, and many of the attendant advantages thereof, readily will be apparent as same becomes better understood by reference to the following detailed description when considered in conjunction with the accompanying drawings in which like reference symbols indicate the same or similar components, wherein.

DETAILED DESCRIPTION OF PREFERRED EMBODIMENT

Reference now will be made in detail to the preferred embodiments of the present invention, examples of which are illustrated in the accompanying drawings.

Figure 1A:
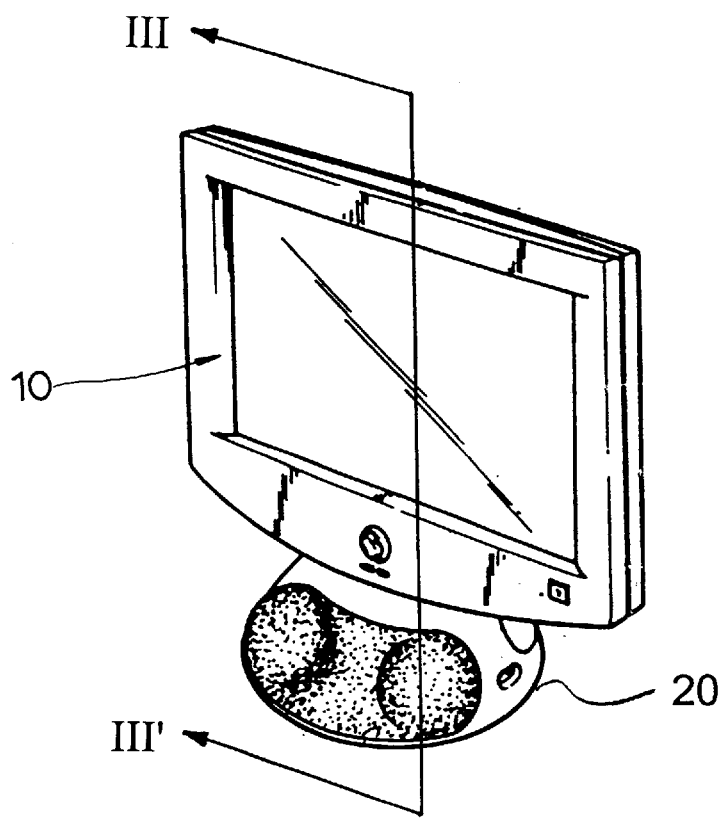
FIGS. 1A and 1B are top right front and left rear views of a flat-panel display apparatus constructed according to the principles of the present invention, respectively.
Figure 1B:
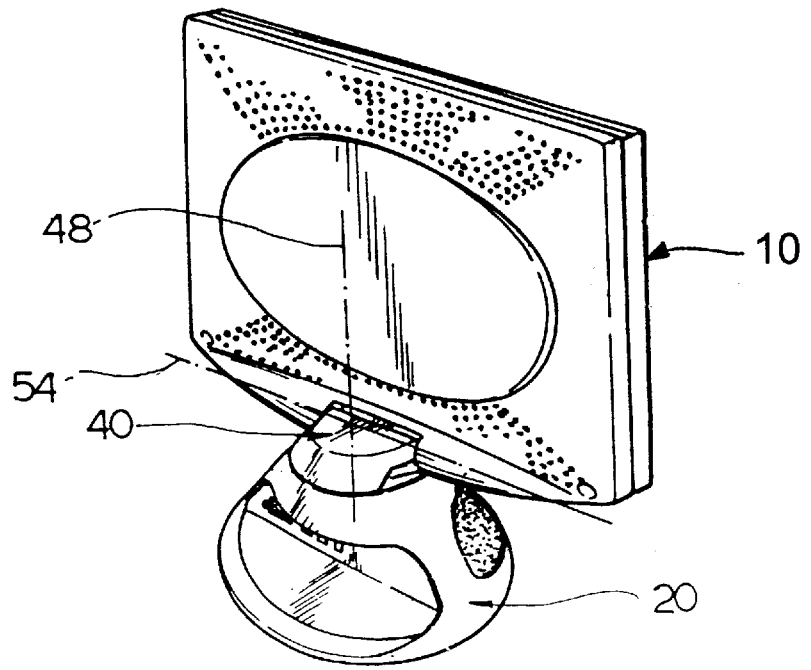

As shown in FIGS. 1A and 1B, the flat-panel display apparatus constructed according to the principles of the present invention largely is divided into a display unit 10 displaying images according to a display signal and supplied with electrical power; a stand unit 20 supporting the display unit 10; and a hinge unit 40, located between the display unit and stand unit, rotatably connecting the display unit to the stand unit and allowing dual-axis adjustment of the viewing angle of the display unit as desired.

The present invention provides a hinge mechanism connecting the display to the stand at a single point. Further, the hinge mechanism allows for bi-directional rotation of the display with respect to the stand, along both a vertical axis 48 and a horizontal axis 54, as shown in FIG. 1B.

Figure 2:
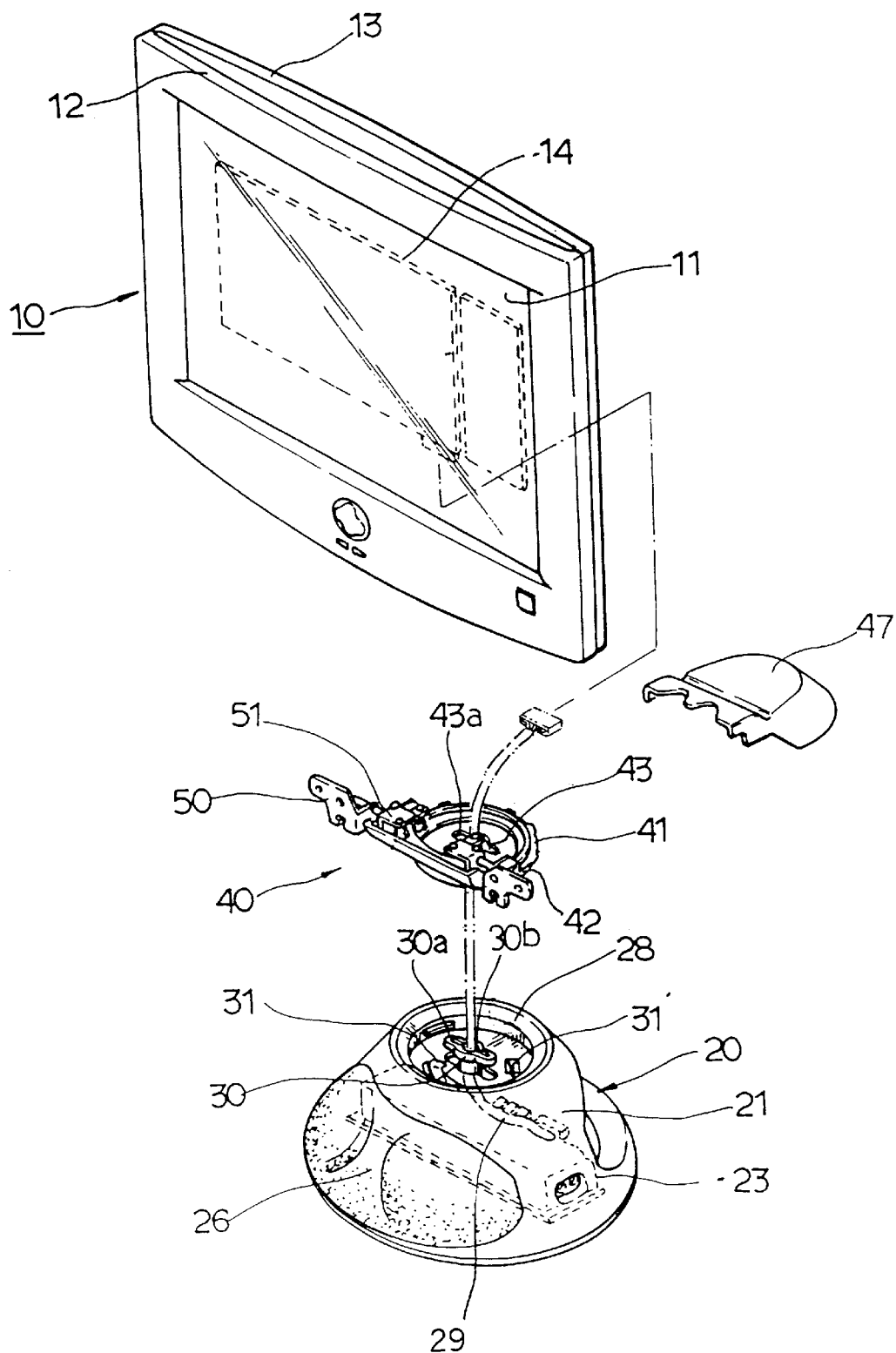
FIG. 2 is a top right front perspective exploded view of a flat-panel display apparatus constructed according to the principles of the present invention.
Figure 3:
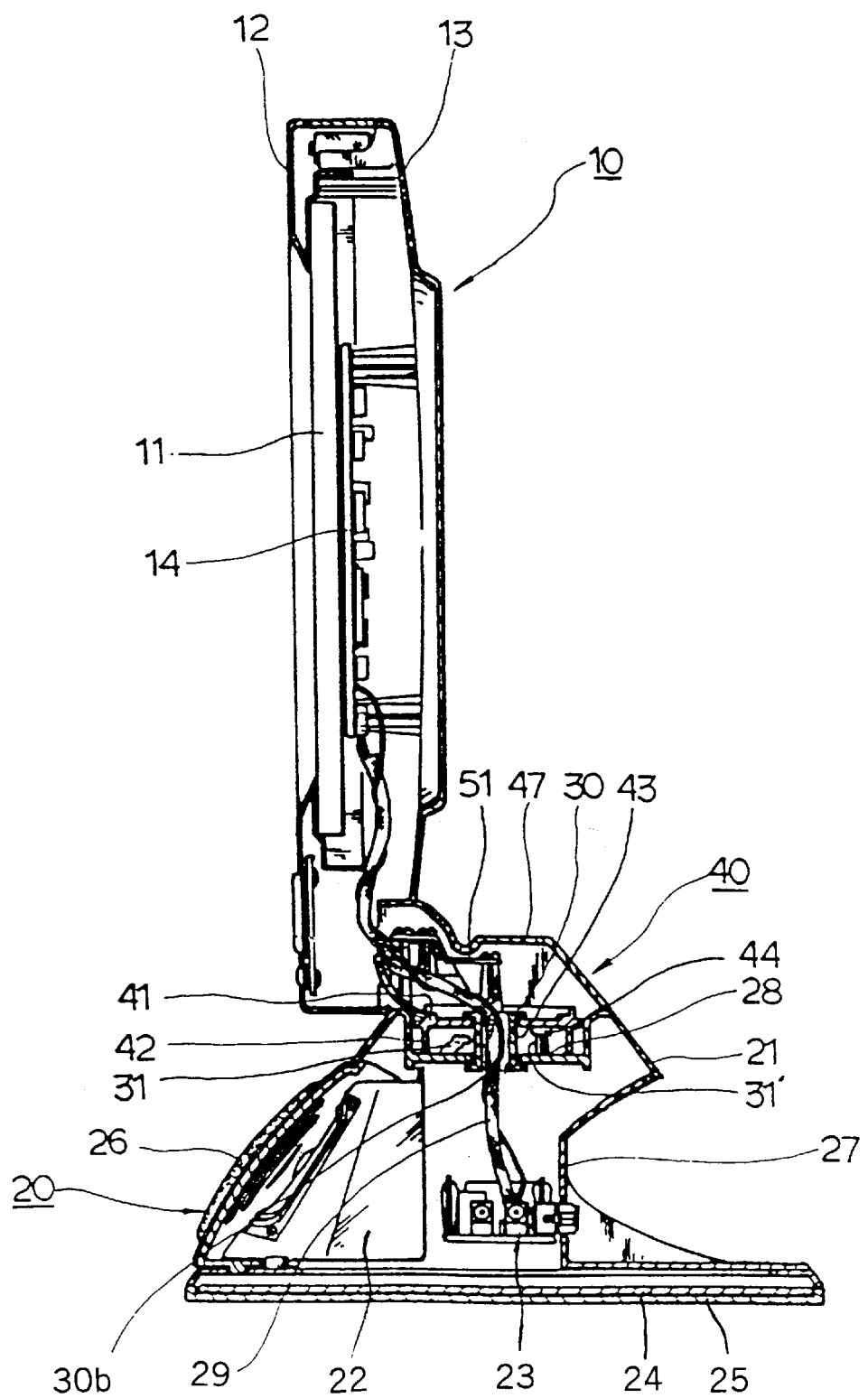
FIG. 3 is a cross-sectional detail view, drawn along line III–III' in FIG. 1, of a flat-panel display apparatus constructed according to the principles of the present invention.

Referring to FIGS. 2 and 3, the display unit 10 includes a panel 11 on which images are displayed (e.g., a liquid crystal panel), front and rear cases 12 and 13, which serve as supporting members for the panel 11, and a main circuit board 14 installed on the inside of the rear case 13. The stand 20 includes a speaker 22, shown in FIG. 3 only, and an interface circuit board 23 installed in a main body 21; a bottom cover 25 to which a weight 24 is attached, both of which being fixed to the bottom of the stand, shown in FIG. 3 only; a speaker cover 26; and an input unit cover 27, shown in FIG. 3 only.

The hinge unit 40 largely is composed of a hinge body 41 having a circular rotation guide 42 which has the same shape (i.e., round) as the inner surface 32 of a rotary guide recess 28 located on the upper portion of the stand body 21. The hinge body 41 may be inserted into the stand unit 20 and slides smoothly when rotated relative thereto. A hinge shaft insertion hole 43, having insertion guide recesses 43a, and insertion guide 35, formed at the center of the rotary guide recess 28, shown in FIG. 2 only, receive a vertical hinge shaft 30 which is inserted perpendicularly with respect to the hinge body 41. Ribs 30a, shown in FIG.2 only, extend from the vertical hinge shaft 30 and correspond to the insertion guide recesses 43a and insertion guide 35.

Figure 5:
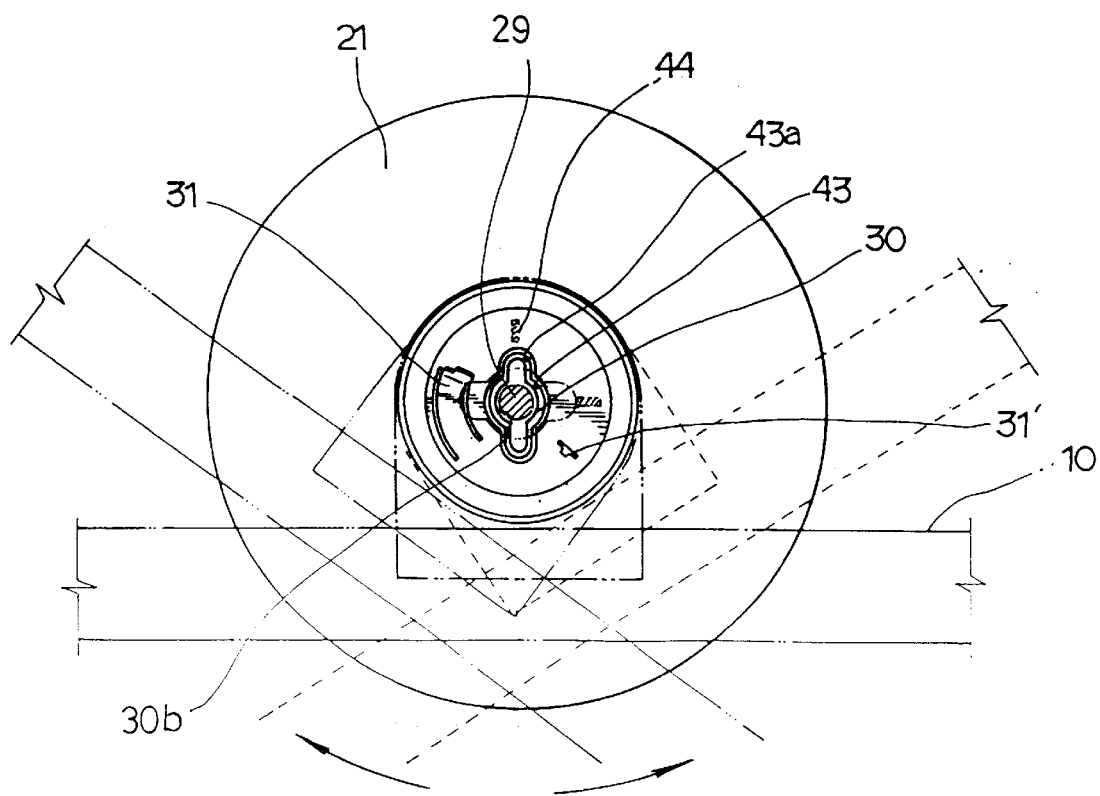
FIG. 5 is a plan view of a flat-panel display apparatus constructed according to the principles of the present invention, alternate rotational positions thereof being depicted in broken lines.

Referring also to FIG. 5, by rotating the hinge body 41 approximately 90°, the ribs 30a of the hinge shaft 30 form an angle of intersection, or are misaligned with, the hinge shaft insertion hole 43, thereby preventing the separation of the display unit 10 from the stand unit 20 due to the interference between the ribs and the rotary guide recess 28. A projection 44, formed on a lower surface of the hinge body 41, moves with the pushing of an elastic projection 31 formed in the rotary guide recess 28, thereby being rotated between the elastic projection and a fixed retainer 31'. In other words, when the hinge body 41 is installed in the rotary guide recess 28, the vertical hinge shaft 30 is received through the hinge shaft insertion hole 43 with the projection 44 pressing against the elastic projection 31, just below the end of the lead line shown on FIG. 5. When the hinge body 41 is rotated clockwise, the projection 44 slides over the elastic projection 31 until it is cleared. Once cleared, the elastic projection 31 assumes its design position which prevents the projection 44 from rotating past it in the opposite direction. The projection 44 is trapped between the elastic projection 31 and retainer 31'.

Referring again to FIG. 2, the hinge unit 40 essentially is provided with a separation preventing unit, preventing the separation of the hinge body 41 from the stand body 21, a rotary angle control unit, limiting the rotation of the hinge body in the stand body, and a side-to-side rotation unit, facilitating rotation of the hinge body about the vertical hinge shaft 30.

A tilting unit is located at the upper side portions of the hinge body 41. The tilting unit includes a first bracket 50 fixed at the bottom interior side of the rear case 13, coupling the display unit 10 with the hinge unit 40; and a second bracket 51 fixed to the hinge body 41. A cover 47 is used to cover the hinge unit 41 entirely.

A cable 29, which transmits display signals and electrical power from the interface circuit board 23, is connected to the main circuit board 14 within the display unit 10 after passing through a passageway 30b formed in the vertical hinge shaft 30, defining a vertical axis. Since the vertical hinge shaft 30 is fixedly installed in the stand main body 21, friction with the cable 29 does not occur as the display unit is rotated relative to the stand unit. The cable 29 is connected to the main circuit board 14 through an enclosed space formed in the lower portion of the display unit 10, and conveys power to drive the liquid crystal panel 11. The main-circuit-board connection is covered with the hinge unit cover 47, thus concealed.

The operation of the flat-panel display apparatus of the present invention now will be discussed with reference to FIGS. 2, 4 and 5.

Figure 4:
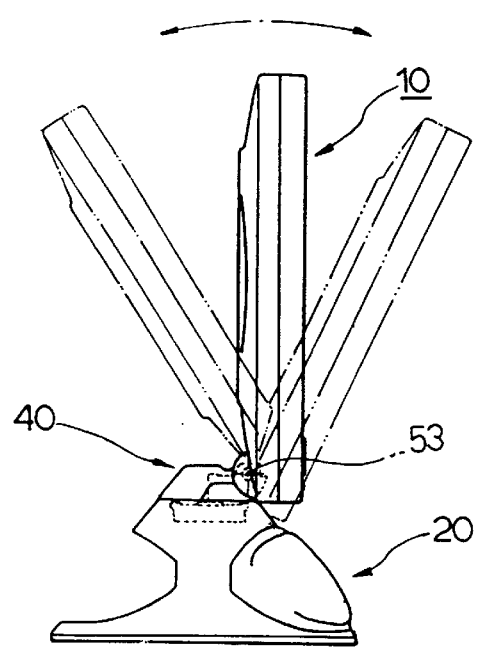
FIG. 4 is a left elevational side view of a flat-panel display apparatus constructed according to the principles of the present invention, alternate tilt positions thereof being depicted in broken lines.

FIG. 4 shows the forward-and-backward capability of the display unit, wherein rotation centers around a horizontal shaft 53, best seen in FIGS. 2 and 4. FIG. 5 shows the featured side-to-side rotational capability of the display unit, facilitating swivelling of the display unity 10 to the right or left as desired, wherein the rotation of the hinge body 41 centers around the vertical hinge shaft 30 having the cable 29 housed therein.

As described above, the flat-panel display apparatus of the present invention has a display unit which can be rotated in two directions, having a tilting range through 120° and a swivel range through 180°. Although the length of the cable 29 connecting the interface circuit board 23 to the main circuit board 14 is increased to compensate for dual-axis display angle adjustments, compared to the prior art, cable twisting does not occur when adjusting the angle of the display unit 10 since the cable passes through the center of the vertical hinge shaft 30 which is stationary. Therefore, the flat-panel display apparatus of the present invention prevents the twisting and disconnection of the cable supplying display signals and electrical power to the display unit, and enables a design improvement by concealing the cable.

It will be apparent to those skilled in the art that various modifications can be made in the liquid crystal display apparatus for preventing cable twisting of the present invention, without departing from the spirit of the invention. Thus, it is intended that the present invention cover such modifications as well as variations thereof within the scope of the appended claims.

What is claimed is:

1. A flat-panel display apparatus, comprising:
    a display unit displaying images according to a display signal and being supplied with electrical power;
    a stand unit comprised of a body terminated at a first extremity by a bottom surface slidably engaging any underlying surface supporting said stand unit, said body supporting said display unit continuously positioned directly above said bottom surface while said display unit is oriented to extend beyond a second extremity of said body at selected angles within a range of angles of tilt relative to said bottom surface as said bottom surface moves in any direction across an underlying surface supporting said stand unit;
    a hinge unit, rotatably connecting said display unit to said stand unit while allowing said display unit to rotate about a first shaft through said range of angles of-tilt, said hinge unit comprised of a hinge shaft radially spaced-apart from said first shaft and providing a hollow passage between said second extremity and said hinge unit;
    a cable, supplying the display signal and electrical power to said display unit, passing through said hinge shaft while said hinge unit rotates about said hinge shaft relative to said body;
    an interface circuit board located in said stand unit; and
    a main circuit board located in said display unit;
    said cable connecting said interface circuit board and said main circuit board.

2. The apparatus according to claim 1, wherein said cable connects with said main circuit board within said display unit.

3. A flat-panel display apparatus, comprising:
    a display unit displaying images according to a display signal and being supplied with electrical power;
    a stand unit supporting said display unit;
    a hinge unit, rotatable connecting said display unit to said stand unit, comprised of a hinge shaft; and
    a cable, supplying the display signal and electrical power to said display unit, passing through said hinge shaft;
    wherein said hinge unit comprises:
    a hinge body having a shaft insertion hole; and
    a shaft received in said shaft insertion hole, said hinge body being rotatable about the shaft;
    said shaft, conducting said cable therethrough, comprising a rib extending therefrom;
    said shaft insertion hole having a shape complementary of said rib;
    whereby association and disassociation of said shaft and said hinge body is accomplished only when said rib is aligned with said shaft insertion hole.

4. The hinge of claim 3, said hinge body further comprising a rotation guide, configured to be rotated within a rotary guide recess of said stand unit, extending therefrom.

5. The hinge of claim 3, said hinge body further comprising a projection, configured to restrict rotation of said hinge body between a first stop and a second stop, extending therefrom.

6. The hinge of claim 5, said first stop comprising an elastic projection extending from a rotary guide recess of a stand.

7. The hinge of claim 6, said elastic projection being biased relative to the rotary guide recess.

8. The hinge of claim 5, said second stop comprising a retainer extending from a rotary guide recess of a stand.

9. The hinge of claim 3, said shaft being generally vertical in orientation.

10. The hinge of claim 3, said hinge body further comprising a bracket, configured to be mounted on said display housing, rotatably mounted thereon.

11. The hinge of claim 10, said bracket being rotatable about a generally horizontal axis.

12. The hinge of claim 3, further comprising a cover mounted on said hinge body.

* * * * *